United States Patent
Velusamy et al.

(10) Patent No.: US 9,753,119 B1
(45) Date of Patent: Sep. 5, 2017

(54) AUDIO AND DEPTH BASED SOUND SOURCE LOCALIZATION

(71) Applicant: Amazon Technologies, Inc., Seattle, WA (US)

(72) Inventors: Kavitha Velusamy, San Jose, CA (US); Ning Yao, San Jose, CA (US); Wai Chung Chu, San Jose, CA (US); Sowmya Gopalan, Cupertino, CA (US); Qiang Liu, Cupertino, CA (US); Rahul Agrawal, Santa Clara, CA (US); Manika Puri, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 14/167,813

(22) Filed: Jan. 29, 2014

(51) Int. Cl.
*G01S 5/20* (2006.01)

(52) U.S. Cl.
CPC ..................... *G01S 5/20* (2013.01)

(58) Field of Classification Search
CPC ........................................................ G01S 5/20
See application file for complete search history.

(56) References Cited

U.S. PATENT DOCUMENTS

| 5,416,513 A | * | 5/1995 | Morisaki | G01S 3/7864 |
| | | | | 348/157 |
| 5,686,957 A | * | 11/1997 | Baker | G02B 3/0087 |
| | | | | 348/14.07 |
| 6,005,610 A | * | 12/1999 | Pingali | G01S 3/808 |
| | | | | 348/14.16 |
| 7,002,617 B1 | * | 2/2006 | Smith | G08B 13/19628 |
| | | | | 340/692 |
| 7,418,392 B1 | | 8/2008 | Mozer et al. | |
| 7,720,683 B1 | | 5/2010 | Vermeulen et al. | |
| 7,774,204 B2 | | 8/2010 | Mozer et al. | |
| 2004/0104702 A1 | * | 6/2004 | Nakadai | B25J 13/00 |
| | | | | 318/568.12 |
| 2006/0143017 A1 | * | 6/2006 | Sonoura | G10L 15/26 |
| | | | | 704/275 |

(Continued)

FOREIGN PATENT DOCUMENTS

WO WO2011088053 A2 7/2011

OTHER PUBLICATIONS

Wang, Object Localization by Joint Audio-Video Signal processing Vision, Modeling, and Visualization 2000: Proceedings ; Nov. 22-24.*

(Continued)

*Primary Examiner* — Hovhannes Baghdasaryan
(74) *Attorney, Agent, or Firm* — Lee & Hayes, PLLC

(57) ABSTRACT

A system may utilize sound localization techniques, such as time-difference-of-arrival techniques, to estimate an audio-based sound source position from which a sound originates. An optical image or depth map of an area containing the sound source location may then captured and analyzed to detect an object that is known or expected to have produced the sound. The position of the object may also be determined based on the analysis of the optical image or depth map. The position of the sound source may then be determined based at least in part on the position of the detected object or on a combination of the audio-based sound source position and the determined position of the object.

22 Claims, 4 Drawing Sheets

(56) References Cited

U.S. PATENT DOCUMENTS

| | | | | |
|---|---|---|---|---|
| 2006/0252474 A1* | 11/2006 | Zalewski | ............... | A63F 13/10 |
| | | | | 463/1 |
| 2010/0033427 A1* | 2/2010 | Marks | ................... | A63F 13/02 |
| | | | | 345/156 |
| 2010/0302247 A1* | 12/2010 | Perez | ................ | G06K 9/00201 |
| | | | | 345/440 |
| 2011/0234481 A1* | 9/2011 | Katz | ....................... | H04N 9/31 |
| | | | | 345/156 |
| 2011/0300929 A1* | 12/2011 | Tardif | ................... | A63F 13/06 |
| | | | | 463/30 |
| 2012/0223885 A1 | 9/2012 | Perez | | |
| 2012/0242800 A1* | 9/2012 | Ionescu | ................ | G06F 3/017 |
| | | | | 348/46 |

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

AUDIO AND DEPTH BASED SOUND SOURCE LOCALIZATION

BACKGROUND

As computing devices evolve, the ways in which users interact with these devices also continue to evolve. In the past, people have interacted with computing devices primarily through mechanical devices (e.g., keyboards, mice, etc.) and electrical devices (e.g., touch screens, touch pads, etc.). In the future, people may interact with computing devices in more natural ways such as by speech, gestures, and physical interactions with surfaces or objects of an environment.

Certain systems may monitor physical characteristics of a room and the users within the room in order to implement user interactions. For example, various sensors may be used to detect and identify sounds and gestures made by a user and may respond in defined ways to such sounds and gestures.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems, devices, and techniques for determining the locations from which sounds originate. In a described implementation, a system may utilize sound localization techniques to provide an initial estimation of a source location of a sound. Based on this initial estimation, a depth map may be captured of an area encompassing the estimated source location. Object detection and recognition techniques may be used to analyze the depth map and to determine the position of an object that has produced the sound. The initial sound source position estimation may then be refined or replaced, based on the analyzed position of the object that produced the sound.

Figure 1:
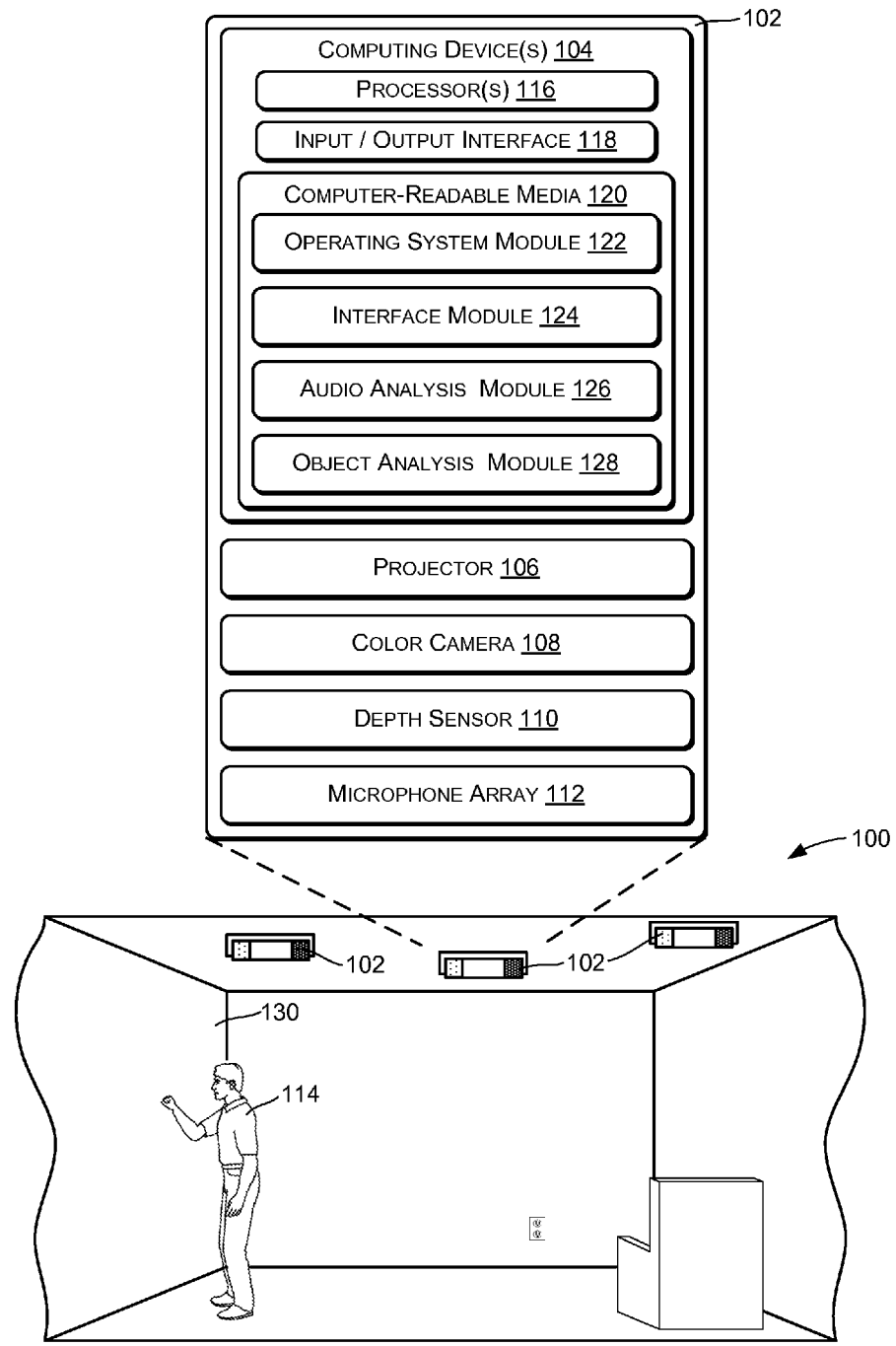
FIG. 1 illustrates an environment that includes an augmented reality functional node (ARFN) configured to detect and localize sounds produced within an environment.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment 100 illustrates three nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

Each ARFN 102 may include one or more computing devices 104 as well as various actuators, output devices, and sensors. As will be described in more detail below, actuators may include motors for moving the ARFN 102 as well as for focusing, rotating, panning, and zooming optical, sensing, and output elements of the ARFN 102.

Output devices of the ARFN 102 may include indicators, projectors, speakers, displays, etc. Sensors may include cameras (e.g., motion and/or still cameras), time-of-flight (ToF) sensors, audio sensors (e.g., microphones), ultrasound transducers, heat sensors, motion detectors (e.g., infrared imaging devices), depth sensing cameras, weight sensors, touch sensors, tactile output devices, olfactory sensors, temperature sensors, humidity sensors, pressure sensors, or combinations thereof. For purposes of the present discussion, the ARFN 102 is illustrated as having a projector 106, a color camera 108, a depth camera or sensor 110, and a microphone array 112, although many implementations may include various other types of output devices, sensors, and other components.

The projector 106 may be used to project content onto surfaces of the environment 100 for viewing by a user 114. The camera 108 and depth sensor 110 may be used for various purposes, such as determining the location of the user 114, detecting user gestures, determining the positions of objects within the environment 100, reconstructing 3D characteristics of objects within the environment 100, and so forth.

The depth sensor 110 may comprise one of various types of sensors, range cameras, or other systems that may be used to observe and evaluate three-dimensional properties of a scene. For example, the depth sensor 110 may utilize time-of-flight measurements to determine relative positions or distances of observed surface points within the scene. In certain implementations, for example, the depth sensor 110 may transmit non-visible light such as infrared light and may monitor reflections of the transmitted light to determine the path lengths of the light as it travels from the sensor, to different surface points, and back to the sensor.

In the described example, the depth sensor 110 produces depth images. Each depth image indicates three-dimensional coordinates of multiple surface points of a scene or area of the environment 100. The depth images may in some situations be referred to as point clouds, because each depth image specifies multiple points in relation to a three-dimensional coordinate system. The depth images may also be referred to as depth maps.

In the described embodiment, the depth sensor 110 comprises a time-of-flight range camera that determines distances to different points within the scene based on time-of-flight of light or other propagated signals. A depth sensor such as this transmits a light signal onto surfaces of a scene and senses reflections of the signal from different points of the surfaces. The depth sensor 110 may use various techniques to measure the travel times of the signal from the depth sensor 110 to the surface points and back to the camera.

In certain embodiments, the entire scene may be illuminated with a pulsed or modulated light signal, such as an infrared light signal. The depth sensor 110 may have a two-dimensional (2D) array of photodetectors, each of which receives reflected light from a corresponding point of a surface within the scene. Because the light signal takes time to propagate from the sensor, to the surface point, and back to the corresponding photodetector, the reflected light signal will be delayed in comparison to that of the transmitted light signal. This delay is apparent in the phase difference between the transmitted signal and the reflected signal as measured by the photodetector. Furthermore, the distance of the reflecting surface can be calculated from the delay based on the known propagation speed of light. Thus, a time-of-flight-based camera may be configured to measure phase differences between transmitted and reflected light and to calculate distances based on the measured phase differences.

In order to obtain an accurate measurement of phase differences, the phases of the transmitted and reflected signals may be compared electronically over a time period, referred to herein as a sensing duration. Longer sensing durations may be used to produce more accurate measurements. A measured phase difference is then converted to a distance as a function of the known speed of light.

Different types of distance or depth sensing may be used in various embodiments. For example, lidar is a technology that uses techniques similar to those described above in conjunction with laser illumination to determine distances to objects or surfaces. When using lidar, a pulsed or modulated laser signal may be scanned over an area using rotating mirrors or other mechanisms. Phase differences between the transmitted and reflected signals are then used to calculate corresponding distances.

Structured light techniques may also be used to determine surface depths. Structured light comprises a geometric pattern that is projected onto the surfaces of a scene. For example, multiple parallel lines may be projected onto the scene. When viewed from the same perspective as the projector, the lines appear straight. When viewed from other perspectives, however, the lines are curved due to irregular surface shapes. By placing a camera at an offset from the projector, these curves may be observed and analyzed to detect the distances of surface points from the projector and/or camera.

The microphone array 112 may comprise multiple individual microphones that are spaced from each other in a known configuration to facilitate sound localization using time-difference-of-arrival (TDOA) techniques. The microphones may be positioned in a single plane or in multiple planes. Any number of microphones may be used. A higher number of microphones generally improves various aspects of sound localization, including accuracy.

The computing device 104 of the example ARFN 102 may include one or more processors 116, an input/output interface 118, and memory or computer-readable media 120. The processors 116 provide operating logic for the ARFN 102 by executing instructions or instruction modules that are stored in the computer-readable media 120 or in other computer-readable media accessible to the processors 116.

The input/output interface 118 may be configured to couple the computing device 104 to other components of the ARFN 102, such as the projector 106, the color camera 108, the depth sensor 110, the microphone array 112, other output and input devices, other ARFNs 102, other computing devices, and so forth.

The computer-readable media 120 may include non-transitory computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by the computing device 104. The computer-readable media 120 may reside within a housing of the ARFN 102, on one or more storage devices accessible on a local network, on cloud storage accessible via a wide area network, or in any other accessible location.

The computer-readable media 120 may store executable components, programs, routines, modules, etc., such as instructions, datastores, and so forth that are configured to execute on the processors 116. For instance, the computer-readable media 120 may store an operating system module 122, an interface module 124, an audio analysis module 126, an object analysis module 128, and other modules that are not specifically shown in FIG. 1.

The operating system module 122 may be configured to manage hardware and services within and coupled to the computing device 104 for the benefit of other modules. The interface module 124 may be configured to receive, interpret, and respond to commands received from users within the environment 100. Commands may be in the form of speech, gestures, sounds, and other means.

The audio analysis module 126 may be configured to receive audio signals from the microphone array 112 and to analyze the signals to detect and/or recognize sounds that occur within the environment 100. The audio analysis module 126 may also be configured to perform sound source localization with respect to recognized or detected sounds. Sound source localization is the process of determining the location from which a sound originates. Such a location is referred to as a source position herein.

In certain embodiments, the audio analysis module 126 may be configured to detect and/or recognize sounds or sound events such as audio taps generated by the user 114. An audio tap may be generated by tapping or knocking on a surface, by clapping hands, by snapping fingers, or by other means. Sound event detection may be performed by analyzing one or more of the microphone signals produced by the microphone array 112 to detect particular waveforms and/or waveform characteristics corresponding to different types of sound events. Such waveforms may be characterized by various factors such as frequency composition, duration, loudness, rise time, decay time, energy envelopes, etc. Audio taps, for example, may be identified as pulses having specified amplitudes, rise times, decay times or rates, durations, and frequency components.

In some embodiments, automatic speech recognition, keyword spotting, and/or other audio detection and recognition techniques may be used to detect and/or identify types of sound events other than taps, such as speech. For example, the audio analysis module 126 may implement automatic speech recognition (ASR) to recognize speech of the user 114. The interface module 124 may include natural language understanding functionality configured to determine user intent based on recognized speech of the user 114. The interface module 124 may respond to the user intent by performing an action in fulfillment of the intent.

The audio analysis module 126 may perform sound localization by analyzing multiple microphone signals captured by the microphone array 112. In particular, the audio analysis module 126 may be configured to determine differences in arrival times of a detected sound at multiple microphones of the array 112. For example, time differences between arrivals of sound at different microphones may be estimated by cross-correlating the microphone signals or by phase transform approaches. Based on the time-of-arrival differences, the position of a detected sound can be performed by spherical interpolation or Brandstein-Adcock-Silverman algorithms.

The object analysis module 128 may be configured to analyze images produced by the camera 108 and/or depth sensor 110 to detect objects within the environment 100 and to determine positions of the objects. The images may be analyzed in various ways, utilizing appropriate combinations and sequences of various techniques. In some embodiments, object detection and/or recognition may be performed by analyzing two-dimensional color images using edge detection, contour or shape recognition, color analysis, pattern analysis, and other techniques. Three-dimensional object detection, performed by analyzing depth images or maps, may utilize techniques that incorporate local appearance codebooks, including bag-of-words approaches and other approaches that model the relationships of object parts. Object detection and recognition techniques may also include Hough transform techniques. In some implementations, appearance codebooks and Hough transform techniques may be combined for recognition of objects based on depth data. So-called Hough forests may also be used, which are based on machine learning algorithms and large sets of training data.

The object analysis module 128 may in certain embodiments be particularly configured to detect humans and human body parts. Body part detection and recognition may involve probabilistically identifying skeletal joints of a human frame. This may involve using many thousands of training images, where each training image comprises a depth map of a human or a human body part in a particular pose. For example, the object analysis module 128 may be configured to detect hands, including fingers and finger joints, based on example depth images of hands in various poses. In some cases, a randomized decision forest classifier or decision tree may be used, based on training using large sets of training images.

Neural networks may be used in some environments to detect and classify objects. Various types of machine learning techniques, including support vector machines or networks, may also be used to detect objects based on depth images or other three-dimensional information.

The object analysis module 128 may in some cases be specifically configured to determine the pose of the hand and its various parts or skeletal joints. Poses or positions of certain hand parts, such as fingers, may be analyzed and tracked over time to determine gestures. In some cases, relative motions of different body parts, such as different fingers or hands, may be analyzed over time to detect gestures. More specifically, a particular body part or point may be analyzed over a sequence of depth images to detect a trajectory of the body part or point. The observed trajectory may be compared to a database of known trajectories to determine whether the observed trajectory comprises a known gesture.

In operation, the ARFN 102 and its components may project a user interface in the form of an image. For example, the ARFN 102 may project various visual content on surfaces within the environment 100. In an example embodiment, the user 114 may select a surface, such as a wall 130, by tapping on the surface. The audio analysis module 126 may be configured to detect the occurrence of the tap and to estimate the location from which the tap occurred using time-difference-of-arrival techniques as described above. Based on this estimation, the object analysis module 128 may analyze the area in the vicinity of the detected tap to detect the location of the hand that produced the tap. The interface module 124 may respond to the detected tap by projecting visual content on the surface 130, based on the proximity of the surface 130 to the hand or other object that produced the tap.

As another example, the audio analysis module 126 may detect and recognize speech uttered by the user 114. The audio analysis module 126 may analyze signals from the microphone array 112 to estimate a position from which the speech occurred. The object analysis module 128 may then obtain a depth image and analyze a portion of the depth image that contains the estimated position to detect a user and/or a user face. The interface module 124 may respond in a way that is dependent upon the location of the user as determined by the object analysis module 128.

Figure 2:
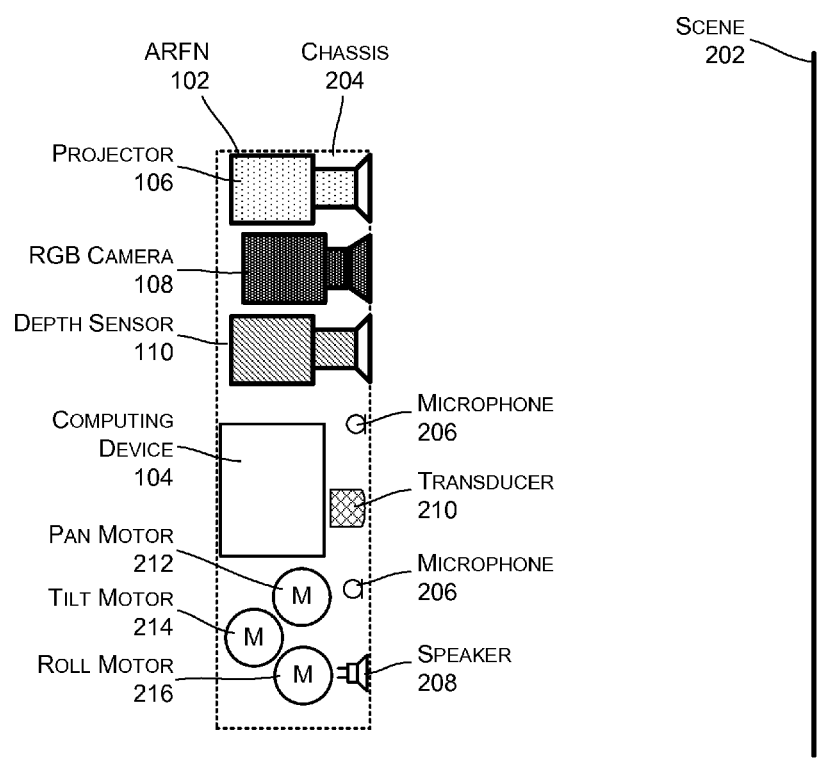
FIG. 2 illustrates components of an example ARFN.

FIG. 2 shows additional details of an example ARFN 102. The ARFN 102 is configured to optically scan an area 202 within the environment 100. The ARFN 102 may be controlled to select and scan different areas 202. That is, the area 202 may be varied so that it encompasses different portions of the environment 100. The ARFN 102 may also be configured to provide output, such as images, sounds, and so forth, within the environment or on surfaces within the area 202.

A chassis 204 holds the components of the ARFN 102. One or more projectors 106 may be disposed within the chassis 204 and may be configured to generate and project display images onto surfaces within the area 202. The projector 106 may be implemented with any number of technologies capable of generating or receiving a display image and projecting that image onto a surface within the area 202. Suitable technologies include a digital micromirror device (DMD), liquid crystal on silicon display (LCOS), liquid crystal display, 3LCD, and so forth. The projector 106 may have variable zoom and focus capabilities. Note that although the area 202 is represented as a planar surface, it may alternatively be defined by an irregular surface and may be defined in part by various objects within the environment 100.

One or more cameras 108 may also be disposed within the chassis 204. The cameras 108 may be configured to image the area 202 in visible light wavelengths, non-visible light wavelengths, or both. The cameras 108 may have variable zoom and focus capabilities.

One or more depth sensors 110 may also be disposed within the chassis 204. As an example, a depth sensor 110 may comprise a time-of-flight camera or other range camera for sensing three-dimensional (3D) characteristics of objects within the area 202. Range cameras may use various technologies to determine distances to surface points of a scene. In embodiments described herein, the depth sensor 110 uses time-of-flight techniques to determine distances. Time-of-flight techniques utilize a signal that is radiated from the sensor and reflected from one or more surface points of the scene. In the described embodiments, the signal comprises a non-visible light signal, although other types of signals may also be used.

One or more microphones 206 may be disposed within the chassis 204, or elsewhere within the environment 100, to form the microphone array 112. The microphones 206 may be used to acquire input from a user, to determine the location of a sound, and/or to otherwise aid in the characterization and receipt of input from the user environment 100. For example, the user 114 may make a particular noise, such as a tap on a wall or a snap of the fingers, that is pre-designated as an attention command input. The user may alternatively use voice commands. Such audio inputs may be located using audio analysis techniques and subsequent optical analysis techniques, as described below, in order to determine positions of users and/or other positions from which sounds originate.

One or more speakers 208 may also be provided in the ARFN 102 to provide for audible output. For example, the speakers 208 may be used to provide output from a text-to-speech module or to playback pre-recorded audio. The speakers 208 may also be used to provide audio associated with visual content that is presented to the user 114.

A transducer 210 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 108. For example, in one implementation the actuator may comprise a pan motor 212, a tilt motor 214, a roll motor 216, and so forth. The pan motor 212 is configured to rotate the chassis 204 in a yawing motion. The tilt motor 214 is configured to change the pitch of the chassis 204. The roll motor 216 is configured to move the chassis 204 in a rolling motion. By panning, tilting, and/or rolling the chassis 204, different views of the area 202 or different areas within the environment 100 may be acquired. In combination, the motors may be used to turn the ARFN and its components toward any desired area or portion of the environment.

In FIG. 2, the computing device 104 is shown within the chassis 204. In other implementations, however, all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment 100, such as televisions, stereo systems, lights, and the like.

In other implementations, the components of the ARFN 102 may be distributed in one or more locations within the environment. As mentioned above, the microphones 206 and speakers 208 may be distributed throughout the environment that includes the ARFN 102. The projector 106, the camera 108, and the depth sensor 110 may also be located in separate chasses 204.

Figure 3:
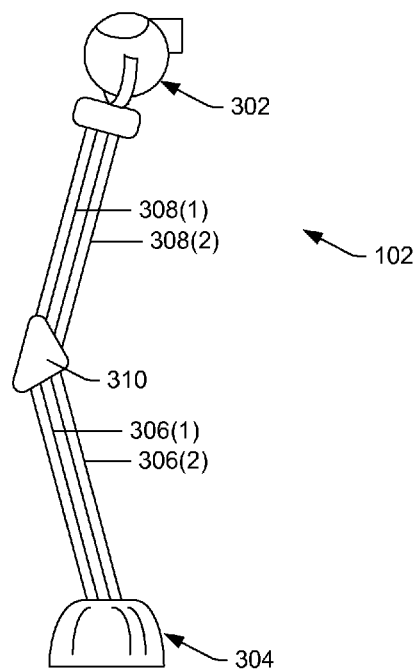
FIG. 3 illustrates an alternative configuration of an ARFN.

FIG. 3 shows an example of an ARFN 102 that resembles a table lamp. In this example, the ARFN 102 has a head 302 attached to a base 304 by a movable arm mechanism. The arm mechanism has two base members or rods 306(1) and 306(2) connected to two head members or rods 308(1) and 308(2) via a joint connector 310.

The ARFN 102 may contain any of the components shown in FIG. 3 as well as other components that may be used to control and/or monitor movement of the head 302 relative to the base 304. The head 302 may contain the projector 106, the camera 108, and the depth sensor 110, for example. The base 304 may contain components such as power components, operating logic, sensor interfaces, actuator interfaces, and so forth. Generally, the components shown in FIG. 2 may be located in either the head 302 or the base 304 of the ARFN 102.

Figure 4:
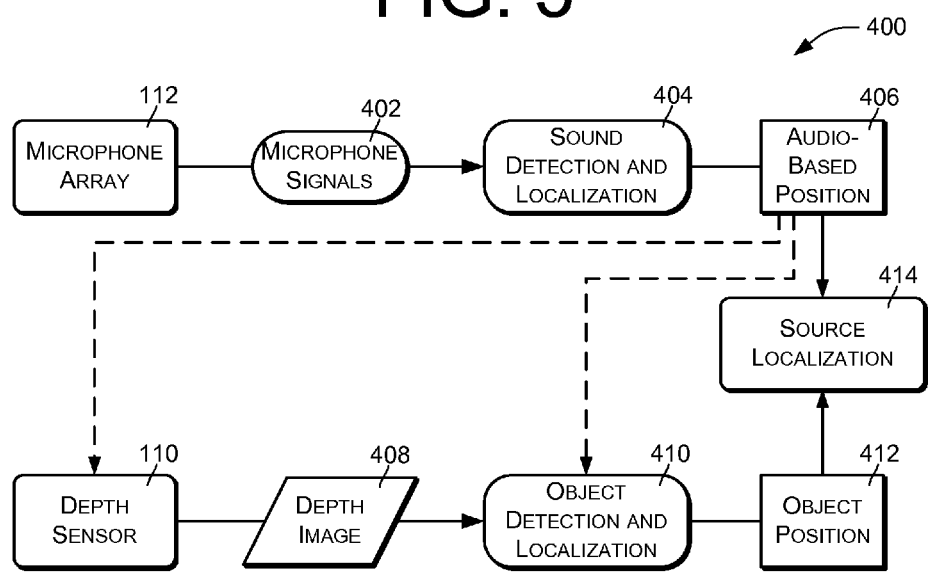
FIG. 4 is a functional diagram illustrating an example processing configuration for localizing sound based on both audio and optical analysis.

FIG. 4 illustrates an example processing configuration 400 that may be implemented within a device such as the ARFN 102 to detect sounds and to determine positions from which the sounds originate. The processing configuration 400 utilizes the depth sensor 110 and the microphone array 112 of the ARFN 102. Functional or logical elements of FIG. 4 may be implemented by the processor 116 under the control of programs, instructions, applications, etc. that are stored in and executed from the computer-readable media 120. For example, the illustrated functionality may be implemented in part by the audio analysis module 126 and the object analysis module 128 of FIG. 1.

The microphones of the microphone array 112 are responsive to sounds generated from with the environment 100 to generate and provide respective input microphone signals 402. The microphone signals 402 may comprise or may be converted to digital signals for analysis by the processor 116, and may be subject to preprocessing.

The microphone signals 402 are received by a sound detection and localization component or function 404. The sound detection and localization function 404 monitors at least one of the microphone signals 402 to detect an occurrence of a particular sound of interest. For example, the sound detection and localization function 404 may be configured to detect an occurrence of an audio tap. An audio tap may be produced by knocking on a surface such as a wall or table, clapping two hands together, by snapping fingers, by tapping one object against another, or by other means. As another example, the sound detection and localization function 404 may be configured to detect user speech and/or to recognize a particular spoken word or phrase.

Determining the position from which a detected sound originates, referred to as sound localization, may be performed by analyzing the multiple microphone signals 402. In particular, the sound detection and localization function 404 may be configured to determine differences in arrival times of the detected sound at the multiple microphones of the microphone array 112. Time-difference-of-arrival techniques as described above may be implemented by the sound detection and localization function 404 to estimate a sound source position from which a detected sound has been produced.

The sound detection and localization function 404 provides an estimated audio-based source position 406, indicating estimated coordinates of the sound source based on audio analysis. The accuracy or precision of the audio-based source position 406 may vary depending on circumstances and conditions. Generally, sounds that originate at farther distances from the microphone array 112 will be localized with less accuracy than sounds that originate from closer to the microphone array 112. Other circumstances may also affect audio-based localization accuracy, including signal-to-noise ratios, source occlusions, etc. The sound detection and localization function 404 may in some cases provide a confidence level indicating the likely accuracy, certainty, or precision of the audio-based source position 406, based on the factors above.

The detected sound may be assumed or determined to have been produced or generated by a certain type of object, such as a hand, finger, mouth, or other human body part. Generally, different types of sounds may be produced by different objects or body parts, and a correlation or mapping may be maintained and used to correlate detectable sounds to the body parts or other objects that are likely to have produced the sounds. In some cases, a sound may be assumed to have been produced or generated by one or more of multiple objects. For example, a tap may be produced by a hand, by a pair of hands, or by two fingers of a hand. A tap or other sound may also be generated by an object other than a human body part, such as a tool or instrument held by a user.

The depth sensor 110 captures and provides a depth map or depth image 408. The depth image 408 may comprise a two-dimensional array of depth values, indicating relative depths or distances of surfaces within the field of view of the depth sensor 110.

Before capturing the depth image 408, the camera 110 may be turned toward the audio based position 406 so that the audio-based position 406 is within the field of view of the depth sensor 110, and so that the object that made the sound is more likely to be within the depth image 408.

An object detection and localization component or function 410 receives and analyzes the depth image 408 to detect the object that made the sound and to determine the position of the object within the environment 100. The depth image 408 may be analyzed by the object analysis component 128 as described above to detect the object and to determine the position of the object. When the object that made the sound comprises a hand, for example, techniques may be used to detect and/or locate one or more hand features or landmarks. Hand features or landmarks may include fingers, fingertips, finger valleys, back of the hand, center of the hand, the wrist, and so forth. In cases where the detected sound comprises speech or other user utterances, facial recognition techniques may be used to detect a face within the depth image 408 and to determine the position of the face. In some cases, color images produced by the camera 108 may also, or alternatively, be analyzed to detect objects within the environment 100 and to determine their positions.

In certain embodiments, the analysis performed by the object detection and localization function 410 may be limited to a portion of the depth image 408 that contains or encompasses the estimated source position 406 produced by the sound detection and localization function 404. More specifically, a portion of the depth image 408 surrounding and containing the object that produced the sound may be roughly identified based on the audio-based source position 406. The size of the portion may depend upon the expected size of the object, upon the distance of the object from the depth sensor 110, and/or upon the expected accuracy or precision of the audio-based position 406. In some cases, the ARFN 102 and/or the depth sensor 110 may be turned or moved, after determining the audio-based position 406 and before capturing the depth image 408, so that the audio-based position 406 is within the field of view of the depth sensor 110.

The object detection and localization function 410 produces an object position 412 based on the analysis of the depth image 408. The object position 412 may in some cases be detected more accurately than the audio-based position 406. In some embodiments, the object detection and localization function 410 may indicate a confidence level for the object position 412, indicating the likely accuracy or certainty of the object position 412.

A source localization function 414 is configured to determine a sound source position based on one or more of the audio-based position 406 and the object position 412. In some cases, the source localization function 414 may simply use the object position 412 as the sound source location, or may derive the sound source position solely from the object position 412. In many cases, the object position 412 will be more accurate and/or more reliable than the audio-based position 406.

In other cases, the source localization function 414 may calculate the sound source position based on an averaging or weighting of the audio-based position 406 and the object position 412. In some cases, confidence levels of the audio-based position 406 and the object position 412 may be considered when weighting the audio-based position 406 and the object position 412. That is, the position 406 or 412 having the highest confidence level may be weighted more heavily when averaging the positions 406 and 412 to determine the sound source location.

Figure 5:
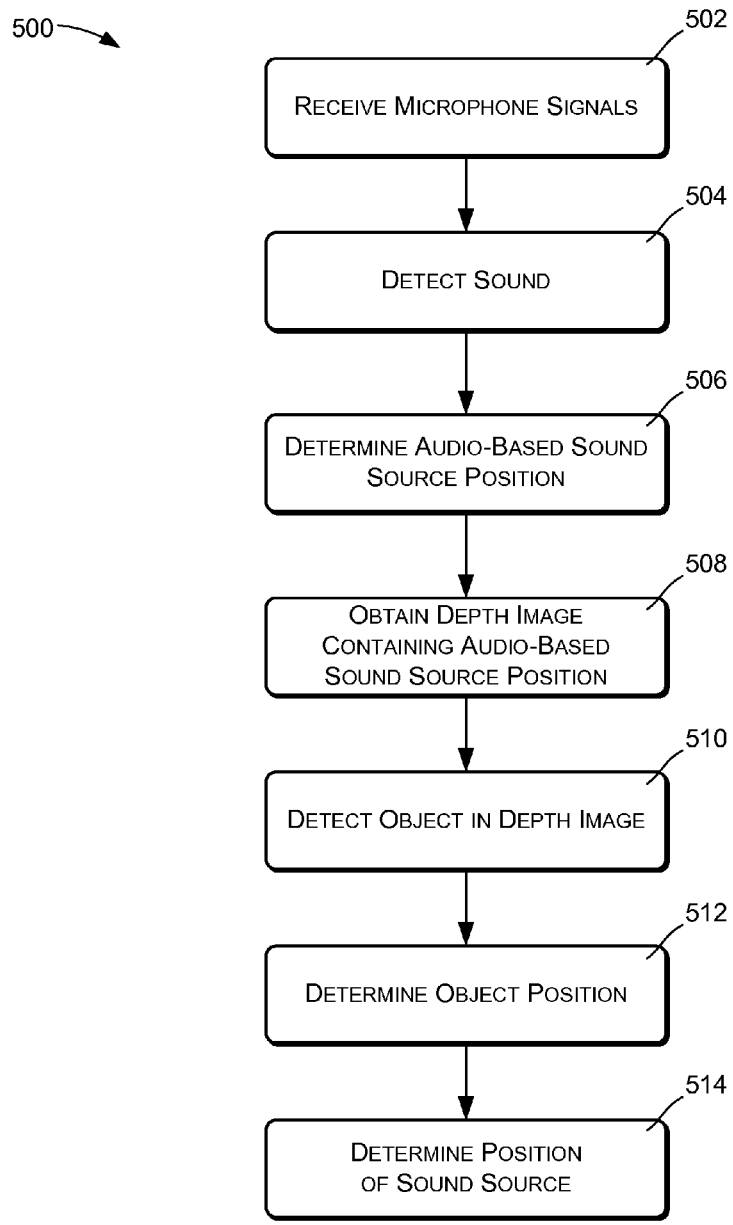
FIG. 5 is a flow diagram illustrating an example process that may be performed by an ARFN or other system to detect and localize sound events.

FIG. 5 illustrates an example method 500 that may be performed to detect and determine the position from which a sound originates. The position from which the sound originates is referred to herein as a sound source position. The sound itself may be generated from a particular location by tapping on a surface, for example. Similarly, an audio tap may be generated by clapping hands, by clicking fingers, or by manipulating one or more objects. Sound may also comprise speech or other sounds uttered by a user. Other sounds may also be detected and localized using the described method 500 or variations thereof.

An action 502 may comprise receiving multiple input microphone signals. The input microphone signals may be produced by and received from a microphone array having microphones that are responsive to sounds generated from within an environment such as a room. The microphones may be spaced from each other in a known configuration to facilitate their use in conjunction with time-difference-of-arrival techniques.

An action 504 comprises analyzing the input microphone signals to detect a sound that has been produced by an object or source from a sound source position. In some embodiments, the sound may be produced by a user, and the object may be considered to comprise the user's body, the user's face, the user's mouth, or one or more other identifiable parts of the user's body. In certain embodiments, the object producing the sound may comprise a body part such as a hand or parts of a hand. The sound may comprise a tap, a user utterance, user speech, or other sound.

An action 506 comprises analyzing the input microphone signals to determine or estimate an audio-based source position of the sound. In certain embodiments, this may comprise determining differences in arrival times of the sound at the microphones of the microphone array and analyzing the differences in arrival times to estimate the audio-based source position. The action 506 may include calculating or specifying a confidence level indicating the level of accuracy or certainty of the determined audio-based source position. The confidence level may decrease with increasing distances between the source position and the microphone array or in situations of high noise or other interference.

An action 508 comprises capturing or otherwise obtaining a depth image of an area or portion of an environment, where the area or portion includes or encompasses the audio-based source position. The image may be captured using a depth sensor, camera, or other sensor that is configured to capture at least an area or portion of the user environment. In some embodiments, the depth image may be captured by transmitting a light signal onto a scene within the environment and measuring times for the light signal to travel to and from the multiple surface points of the scene.

In some embodiments, the action 508 may include turning the sensor or camera toward the audio-based source position before capturing an image, so that the audio-based source position is centered or otherwise positioned within the field of view of the sensor or camera. This may ensure that the object that produced the sound is fully represented within the captured depth image.

An action 510 may comprise detecting the object that produced the sound in the captured depth image or other image. The action 510 may comprise analyzing a portion of the captured image corresponding to an area near or surrounding the audio-based source position. The size of this area may be less than all of the captured depth image. The size of the area may be determined based on the expected size of the object, the likely accuracy or certainty of the audio-based source position, and/or other factors.

The object detected in the action 510 corresponds to the type of sound detected in the action 504. If a tap is detected, for example, the action 510 may comprise detecting a hand or one or more fingers. If speech is detected, the action 510 may comprise detecting a human body, a part of a human body, a face, or a mouth.

An action 512 comprises determining the position of the detected object relative to the environment, based at least in part on the detection of the object in the action 510. The action 512 may comprise determining the position of the object relative to the camera system used to capture the image, and may further comprise conversion of this position to a room or "world" coordinate system based on the known position and orientation of the camera relative to the surrounding environment.

An action 514 comprises determining the position of the sound source, based at least in part on the position of the detected object. For example, the position of the detected object may be deemed to comprise the object-based sound source position. Alternatively, a surface in the proximity of the detected object may be deemed to comprise the sound source position.

In some cases, determining the sound source position may be based on a weighted combination of (a) the audio-based source position and (b) the determined position of the object. In some cases, the weights or contributions of the audio-based source position and the object position may be determined by confidence levels associated with the two positions. More specifically, a position having a higher confidence level may be weighted more heavily than a position having a lower confidence level.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
    a microphone array having microphones that are responsive to sounds generated from within an environment to produce input microphone signals;
    a depth sensor that is configured to capture a depth image of at least a portion of the environment; and
    operating logic configured to perform acts comprising:
       analyzing one or more of the input microphone signals to detect a sound that has been produced from a source position;
       analyzing the one or more of the input microphone signals to determine differences in arrival times of the sound at the microphones of the microphone array;
       analyzing the differences in arrival times to determine a first estimate of the source position of the sound, the first estimate of the source position of the sound including a first confidence level based on a signal-to-noise ratio associated with the one or more of the input microphone signals;
       analyzing at least a portion of the depth image that encompasses the source position to detect a human body part in the depth image;
       determining a position of the human body part based at least in part on the depth image, the position of the human body part being associated with a second confidence level based at least in part on an accuracy of the position; and
       determining a second estimate of the source position based at least in part on a weighted average of the position of the human body part and the first estimate of the source position of the sound, the weighted average based at least in part on the first confidence level and the second confidence level.

2. The system of claim 1, the acts further comprising turning the depth sensor toward the first estimate of the source position after determining the first estimate of the source position and before capturing the depth image so that the depth image comprises the first estimate of the source position.

3. The system of claim 1, wherein determining the second estimate of the source position is based at least in part on a combination of (a) the first estimate of the source position and (b) the position of the human body part.

4. The system of claim 1, wherein the sound comprises an audio tap and the human body part comprises a hand or one or more parts of a hand.

5. A method comprising:
    receiving multiple input microphone signals;
    analyzing one or more of the multiple input microphone signals to determine a first estimate of a source position of a sound produced by an object;
    capturing a depth image of an area that encompasses the first estimate of the source position of the sound;
    determining a position of the object based at least in part on the depth image; and
    determining a second estimate of the source position of the sound based at least in part on a weighted average of the first estimate of the source position of the sound and the position of the object, the weighted average based at least in part on a first confidence level associated with the first estimate of the source position of the sound and a second confidence level associated with the position of the object, the first confidence level based at least in part on a signal-to-noise ratio associated with the one or more of the multiple input microphone signals.

6. The method of claim 5, wherein capturing the depth image comprises:
    transmitting a light signal; and
    measuring times for the light signal to travel to and from multiple surface points.

7. The method of claim 5, wherein analyzing the one or more multiple input microphone signals to determine the first estimate of the source position of the sound comprises determining differences in times of arrival of the sound at multiple microphones.

8. The method of claim 5, further comprising turning a depth camera toward the first estimate of the source position of the sound before capturing the depth image.

9. The method of claim 5, further comprising:
analyzing the one or more of the multiple input microphone signals to determine a type of the sound produced by the object;
identifying a portion of the depth image that includes the first estimate of the source position of the sound, wherein the portion comprises less than all of the depth image, and wherein the portion is based at least in part on the type of the sound; and
analyzing the portion of the depth image to determine the position of the object.

10. The method of claim 5, wherein the object comprises a hand or one or more parts of a hand.

11. The method of claim 5, wherein the sound comprises speech and the object comprises one or more of a human, a human head, a human face or a human mouth.

12. The method of claim 9, further comprising correlating the sound with an expected object that is likely to have produced the sound; and
wherein the portion is further based at least in part on a size of the expected object.

13. The method of claim 5, further comprising:
determining, based at least in part on the sound produced by the object, that the sound corresponds to a selection of a surface; and
projecting image content onto the surface, the image content including at least a user interface.

14. A method comprising:
analyzing one or more input microphone signals to determine a first estimate of a source position of a sound emitted in an environment;
capturing an image that encompasses the first estimate of the source position of the sound;
analyzing the image to detect a position of a source of the sound in the image; and
determining a second estimate of the source position of the sound based at least in part on a weighted average of the first estimate of the source position of the sound and the position of the source of the sound in the image, the weighted average based at least in part on a first confidence level associated with the first estimate of the source position of the sound and a second confidence level associated with the position of the source of the sound in the image, the first confidence level based at least in part on a signal-to-noise ratio associated with the one or more input microphone signals.

15. The method of claim 14, wherein capturing the image comprises:
transmitting a light signal; and
measuring times for the light signal to travel to and from multiple surface points.

16. The method of claim 14, wherein:
the one or more input microphone signals comprise multiple microphone signals that are received from multiple microphones; and
analyzing the one or more input microphone signals to determine the first estimate of the source position of the sound comprises analyzing the multiple microphone signals to determine differences in arrival times of the sound at the multiple microphones.

17. The method of claim 14, wherein the image comprises a depth image that indicates relative positions of surface points.

18. The method of claim 14, further comprising turning a camera toward the first estimate of the source position of the sound before capturing the image so that the image encompasses the first estimate of the source position of the sound.

19. The method of claim 14, further comprising:
identifying a portion of the image that includes the first estimate of the source position of the sound, wherein the portion comprises less than all of the image; and
wherein analyzing the image comprises analyzing the portion of the image.

20. The method of claim 14, wherein determining the second estimate of the source position of the sound is based at least in part on the weighted average of (a) the first estimate of the source position of the sound and (b) the position of the source of the sound in the image.

21. The method of claim 14, wherein source of the sound comprises a human body part.

22. The method of claim 14, further comprising:
analyzing the one or more input microphone signals to determine a type of the sound; and
detecting a waveform characteristic of the one or more input microphone signals corresponding to a sound event of a plurality of sound events, wherein the analyzing the one or more input microphone signals to determine the type of the sound is based at least in part on the waveform characteristic.

* * * * *